April 27, 1965     L. D. BARTLETT     3,180,665

TYING AND CUTTING DEVICE

Filed Dec. 5, 1963     2 Sheets-Sheet 1

INVENTOR
LAWRENCE D. BARTLETT

BY
ATTORNEY

April 27, 1965   L. D. BARTLETT   3,180,665
TYING AND CUTTING DEVICE
Filed Dec. 5, 1963   2 Sheets-Sheet 2
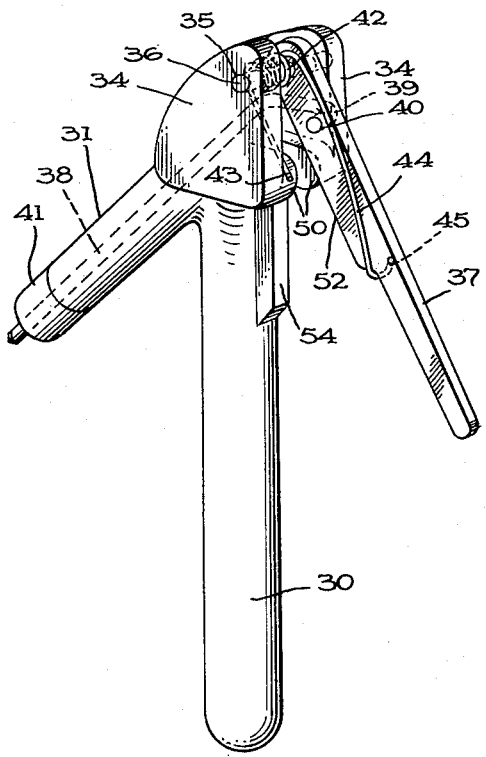
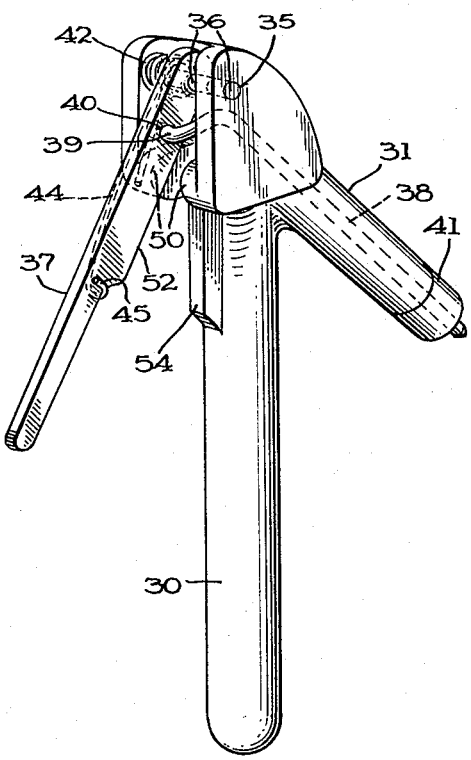
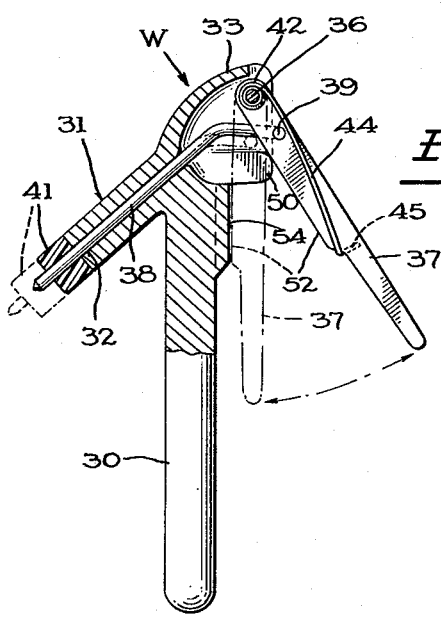
INVENTOR
LAWRENCE D. BARTLETT
BY Edwin E. Greigg
ATTORNEY United States Patent Office 3,180,665
Patented Apr. 27, 1965

3,180,665
TYING AND CUTTING DEVICE
Lawrence D. Bartlett, Rte. 2, Hartford, Ky.
Filed Dec. 5, 1963, Ser. No. 329,613
11 Claims. (Cl. 289—17)

This invention relates to knot-tying devices and, more particularly to miniature, portable devices of this type intended for use by fishermen, and is a continuation-in-part application of Serial No. 236,593, filed November 9, 1962, now abandoned.

Anyone who has attempted to secure a leader or snell to a fishhook and thereafter tie a knot to these elements has undoubtedly found this to be a very tedious and difficult task.

It is, accordingly, an object of this invention to overcome these disadvantages by providing a new principle in knot tying devices in which the tying operation is greatly facilitated.

It is another object of the invention to provide devices of the type which position the eye of the hook substantially adjacent to the knot-tying member.

It is still another object of the invention to combine a cutting means with the knot-tying devices for facilitating severing of the gut, thus obviating the necessity of an additional device, such as scissors.

The details of the invention, as well as additional objects and advantages, will be clearly understood with reference to the embodiments illustrated in the accompanying drawing employing similar reference numerals to identify the same elements in each of the similar views, and in which:

FIG. 8 is a perspective view of a modified embodiment of the device looking generally into the rear portion thereof;

FIG. 9 is a perspective view of the device shown in FIG. 8 looking into the rear of the device from the opposite side; and FIG. 10 is a side view of the modified form of the invention partially in elevation and with the operating means being shown in section.

Figure 1:
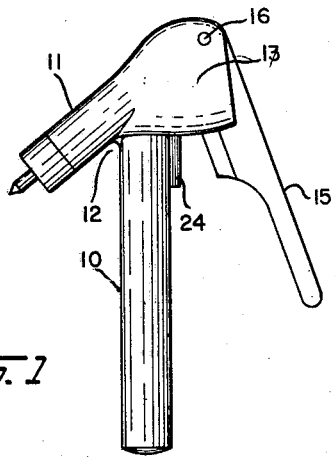
FIG. 1 is an elevational view of the knot-tying device in position ready for use.
Figure 2:
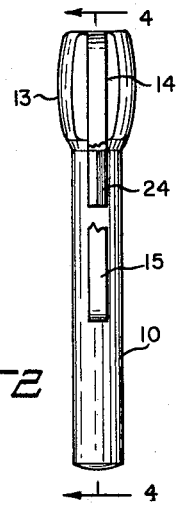
FIG. 2 is an elevational rear view thereof.
Figure 3:
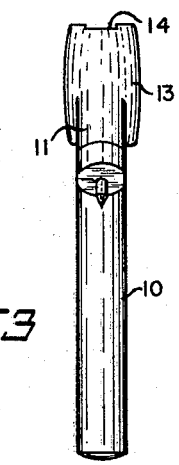
FIG. 3 is an elevational front view of the knot-tying device.
Figure 4:
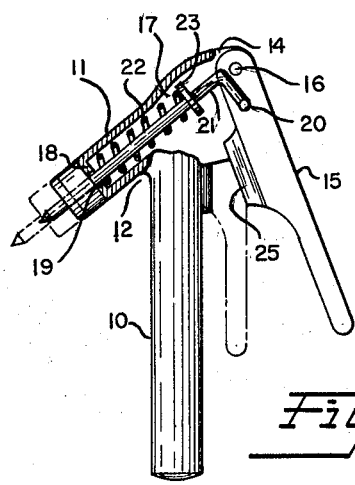
FIG. 4 is a side view of the device partially in elevation and with the operating means being shown in section.

With further reference to the drawing, and particularly FIG. 4, there is shown a body 10, to the upper portion of which is suitably secured, such as by welding, an arm 11, said arm being disposed at an angle to the body 10, thus providing an arcuate groove or recess 12 into which the fishhook may be positioned preparatory to the winding operation which will be described in greater detail hereinafter. The arm 11 is provided with an enlarged portion of generally bulbous configuration, as indicated at 13 (FIG. 1), the rear portion thereof being slotted, as at 14, and thereby adapted to receive a lever 15 which is pivotally associated in the slot by a pin 16.

Further, as also best shown in FIG. 4, the arm 11 is provided with a bore 17, one end of which merges with the slotted portion 14, the opposite end of said arm being constricted, in any preferred manner, to provide an annular collar 18 and arranged to include a guideway 19 for a purpose now to be explained.

The pivotal lever 15 is provided with a transversely extending aperture 20 in the area adjacent to its pivotal engagement and point of oscillation with the enlarged portion 13 of arm 11, said aperture serving to position the laterally extending end portion of a generally L-shaped rod 21. In other words, the rod 21, which is substantially L-shaped is affixed to the pivotal lever 15 in an area lying beneath the fulcrum point thereof with the arm.

A coil spring 22 is positioned in said bore 17 and encompasses the rod 21, one end of said spring being positioned in abutting relation to the annular collar 18 with the opposite end thereof contacting a stop disc means 23 which is held against sliding movement outwardly of the rod 21 by a detent or any other preferred means. Thus, it will be apparent that the rod is provided with a stop means serving as an abutment for the spring means.

The body 10, the perimeter of which is preferably cylindrical, is provided with an anvil 24 which has a V-shaped trough adapted to receive a cutter blade 25 which is formed on the inner surface of the pivotal lever 15. The movement of the cutter blade by oscillating the lever relative to its hinge pin 16 at the upper part of 13 is best shown in FIG. 4 in both dotted and solid outline.

It is to be noted that the outwardly extending end of the rod 21 is in the shape of a cone and is thus handy for the fisherman to use as an eye cleaner for the fishhook.

In the modified embodiment of the invention shown in FIGS. 8 through 10, the body portion 30 is also of substantially cylindrical contour for a reason that will be apparent as the description progresses. In this embodiment, the device, which may be cast of any preferred metal, has an angular arm 31 that is provided with an axially extending bore 32, the upper end of the arm being integral with the body portion 30 and merging into a generally triangular shoulder portion 33. As is apparent from an examination of the respective views relating to this embodiment, an integrated web means, generally indicated at W in FIG. 10, is adapted to rigidify the spacedly arranged triangularly shaped elements which are suitably apertured at 35—35 and arranged to receive therein a pivot pin 36 substantially intermediate the ends of which is rotatably supported a lever 37.

As described in connection with the embodiment of the invention shown in FIGS. 1–4, there is also utilized in the modified form of the inveniton a generally L-shaped rod means 38 which is slidably supported in the bore 32, the upper end thereof being provided with a right angular free end portion 39 which is associated with an aperture 40 in the pivotal lever 37. Also, in this embodiment of the invention, the rod means 38 extends beyond the end of the angular arm 31 and has affixed thereto a nose portion 41 which may be constructed of any suitable moldable material, such as plastic, metal, etc.

From an examination, particularly of FIGS. 8 and 10, it will be observed that a hairspring 42 is wound about the pivot pin 36 with the short free end leg portion 43 abutting the upper edge of one portion of a shoulder to be described hereinafter, the opposite dependent end portion of the elongated leg 44 including a hook-like means 45 associated with a notch 46 in the lever 37. Thus, it will be apparent from the cooperation of the means recited that the lever 37 is normally, under the influence of the hairspring, projected into the angular position shown in FIGS. 8–10.

The diametrically disposed shoulders 50—50, which are best shown in FIGS. 8 and 9, serve to guide the cutting edge of knife 52 through an arcuate path about the pivot pin 35 thereby preventing lateral deflection of the lever 37 (note relation of knife relative to shoulder 50) during the time its knife edge is brought into contact with the anvil 54 to accomplish the severing operation.

Operation

Figure 5:
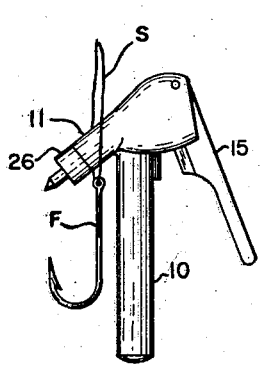
FIG. 5 is a side elevational view with a fishhook and leader shown in assembled relation.
Figure 6:
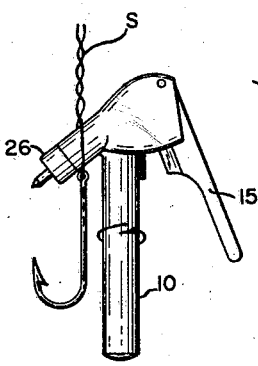
FIG. 6 is a side elevational view of the knot tier with the leader being wound, as indicated by arrow.
Figure 7:
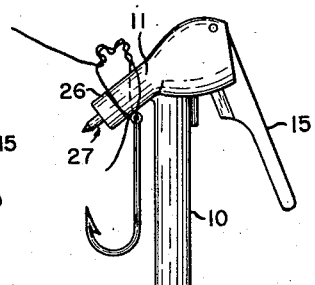
FIG. 7 is a side elevational view of the knot tier showing the free end of the leader engaged by tying means.

By now referring to FIGS. 5, 6 and 7 the operation of the knot-tying device will be readily understood. In the first of these views one can imagine that the body 10 of the device is held between the thumb and index finger of the right hand. Of course, it is also to be understood that the device can be utilized equally as well by a left handed person by merely reversing the procedure described. However, for the purpose of this description its use by one who is assumed to be right handed will be described.

With the eye of fishhook F having been previously threaded, the leader or snell S is then looped about the arm 11, as shown, and held by the thumb and index finger of the left hand of the fisherman or other user. At this time the body 10 is rolled or twirled between the thumb and index finger of the right hand to provide the twisting of the gut, as shown in FIG. 6. Then, by gripping the body 10 between the medius finger, while still holding the leader and fishhook with the left hand, the operator may depress lever 15 (FIG. 4) until the nose portion 26 is moved outwardly of the arm 11 against the action of spring 22. Thereafter, with the left hand the short end of the leader is placed in the opening between the nose portion 26 and the arm 11, the lever is released and thus returned to the position shown in FIG. 7. By now pulling the leader downwardly over arm 11 the gripped end will pass through the twisted gut and form a knot. When this is accomplished, the surplus end of the leader may be dropped off by passing the same between the anvil 24 and cutter 25, and depressing lever 15.

It is believed to be apparent that, although the description of the operation of this device, as set forth above, has been carried out by use of the reference numerals applied to the figures on sheet 1, since the alternative form of the invention operates in substantially the same manner, it need no further description.

Although two embodiments of the invention have been depicted and described, it will be apparent that these embodiments are illustrative in nature and that a number of other modifications in the apparatus and variations in its end use may be effected without departing from the spirt or scope of the invention as defined in the appended claims.

I claim:

1. In apparatus for facilitating tying leaders upon fishhooks: a body, an arm secured to said body, said arm being provided with a bore; a lever fulcrumed to said arm adjacent to one end thereof, a rod secured to said lever and extending through said bore, a spring means positioned in said bore encompassing said rod and leader holding means positioned exteriorly of said arm at the opposite end thereof and actuable by said lever means.

2. In apparatus for facilitating tying leaders upon fishhooks as claimed in claim 1, wherein the rod is provided with stop means serving as an abutment for the spring means.

3. In apparatus for facilitating tying leaders upon fishhooks as claimed in claim 1, wherein the body is provided with an anvil adapted to cooperate with a knife blade formed on the lever beneath the fulcrum point thereof with said arm.

4. In apparatus for facilitating tying leaders upon fishhooks as claimed in claim 2, wherein the arm is provided with a constricted area adjacent to said bore, said constriction serving to guide the rod in reciprocatory travel in said bore.

5. In apparatus for facilitating tying leaders upon fishhooks as claimed in claim 1, wherein the rod is substantially L-shaped and is affixed to said lever in an area lying beneath the fulcrum point thereof with the arm.

6. In apparatus for facilitating tying leaders upon fishhooks as claimed in claim 5, wherein the outwardly extending free end of the rod is cone shaped.

7. In apparatus for facilitating tying leaders upon fishhooks: a body, an arm formed integrally with said body, said arm being provided with a bore extending axially therethrough, a lever pivotally secured to said arm adjacent to said body, a rod associated with said lever and extending through said bore, a spring means carried by said lever pivot and including offstanding free end portions each said free end portion being in cooperative relation with said body and said lever reespectively and leader holding means positioned exteriorly of said arm at the opposite end thereof and actuable through said lever means.

8. In apparatus for facilitating tying leaders upon fishhooks as claimed in claim 7, wherein said spring means carried by said lever pivot comprises a hairspring having plural legs of varying lengths, the free end of the one short leg being adapted to cooperate with the body and the other elongated leg being in cooperative relation with the lever substantially medially thereof.

9. In apparatus for facilitating tying leaders upon fishhooks as claimed in claim 7, wherein the body includes offstanding diametrically opposed shoulder portions adapted to guide the lever in its arcuate path of travel toward said body.

10. In apparatus for facilitating tying leaders upon fishhooks as claimed in claim 7, wherein said body includes an anvil portion adapted to cooperate with a knife blade formed on the lever beneath the pivot means.

11. In apparatus for facilitating tying leaders upon fishhooks: a body, an arm formed integrally with said body, said arm being provided with a bore extending axially therethrough, a lever pivotally secured to said body, said lever including front and rear surfaces, the former of which includes a cutting edge portion, a rod in cooperative relation with said lever and having a free end portion extending through and projecting beyond said bore, a nose element secured to said free end portion, an anvil carried by said body substantially medially thereof and in an area beneath said lever pivot, plural diametrically opposed shoulder portions carried by said body serving to guide the cutting portion of the lever in its arcuate path of travel toward the anvil carried by said body, a hairspring carried by said lever pivot and including a pair of offstanding free end portions of varying lengths, one of the free end portions of the hairspring abutting one of said shoulder portions and the other cooperating with the lever beneath the area of the cutting edge portion to maintain said lever in a normally extended position.

References Cited by the Examiner

UNITED STATES PATENTS

| | | | |
|---|---|---|---|
| 465,894 | 12/91 | Stone | 289—17 |
| 1,481,754 | 1/24 | Stalson | 289—17 |
| 2,934,369 | 4/60 | Kennedy | 289—17 |
| 3,101,964 | 8/63 | Reaser | 289—17 |

DONALD W. PARKER, *Primary Examiner.*

MERVIN STEIN, *Examiner.*